United States Patent [19]

Scanlon

[11] 3,857,953

[45] Dec. 31, 1974

[54] ARYLIDENE CYCLANONES IN INHIBITING ANDROGEN ACTION

[75] Inventor: William B. Scanlon, Indianapolis, Ind.

[73] Assignee: Eli Lilly and Company, Indianapolis, Ind.

[22] Filed: Dec. 18, 1972

[21] Appl. No.: 315,947

Related U.S. Application Data

[63] Continuation-in-part of Ser. No. 182,123, Sept. 20, 1971, abandoned.

[52] U.S. Cl. ................................................ 424/331
[51] Int. Cl. ........................................... A61k 27/00
[58] Field of Search ..................... 424/331; 260/240

[56] References Cited

UNITED STATES PATENTS 3,389,986   6/1968   Di Bella et al. ..................... 424/331

Primary Examiner—Stanley J. Friedman
Attorney, Agent, or Firm—William C. Martens, Jr.; Everet F. Smith

[57] ABSTRACT

A method for inhibiting action of androgens by administering an effective amount of an arylidene cyclanone, anti-androgen compositions containing an arylidene cyclanone, and selected arylidene cyclanones.

7 Claims, No Drawings

ARYLIDENE CYCLANONES IN INHIBITING ANDROGEN ACTION

CROSS REFERENCE TO RELATED APPLICATIONS

This is a continuation-in-part of my co-pending application, Ser. No. 182,123 filed Sept. 20, 1971, and abandoned after the filing of this application.

BACKGROUND OF THE INVENTION

This invention relates to a method for inhibiting androgen action and to substances having anti-androgen activity. Androgens are substances active in stimulating secondary sex characteristics in males. Although androgens are obviously of great physiological significance, they do produce certain undesirable side effects which it would be highly advantageous to prophylactically or therapeutically eliminate or minimize. For example, acne, an inflammatory disease involving the sebaceous glands and found chiefly in adolescents, is thought to be dependent upon sebum secretion which in turn is dependent upon androgen action. Prostatic hypertrophy, a condition encountered primarily by males of middle age or older, likewise is thought to be androgen dependent. This invention is directed to substances useful in and to a method for reducing androgen action and thereby diminishing undesirable side effects of androgens.

Androgens are steroidal hormonal agents. For some time it has been customary to attempt control of androgen activity by administration of other steroids. However, in general, an administration of these steroids, although effective to diminish androgen action, results in other unwanted side effects which limit their usefulness. This invention is directed to compounds having anti-androgen activity as well as to a method for inhibiting androgen action and involves the administration of substances which are non-steroidal in structure and which avoid undesirable side effects resulting from steroidal administration.

The compounds employed in accordance with this invention are arylidene cyclanones. Diarylidene cyclohexanones, which are similar structurally to the arylidene cyclanones administered in the method of this invention, previously have been described in U.S. Pat. No. 3,389,986 as being useful as insecticides, miticides, fungicides, nematocides, and herbicides. However, it is entirely unexpected that arylidene cyclanones, of which diarylidene cyclohexanones are a class, would exhibit any activity with respect to inhibiting the action of androgens.

SUMMARY OF THE INVENTION

As mentioned above, this invention relates to certain arylidene cyclanones and to a method for inhibiting androgen action. Particularly, it relates to a method for inhibiting the action of androgens by administering an effective quantity of an arylidene cyclanone. More particularly, this invention relates to a method for inhibiting the action of androgens which comprises administering to a subject exhibiting a superabundance of androgen action an effective quantity of an arylidene cyclanone having the formula

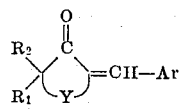

in which Y is —CHR—, —CHR—CHR—, or —CHR—CHR—CHR—; each R independently is hydrogen, methyl, ethyl or propyl; Ar is phenyl, furyl, thienyl, styryl, naphthyl, or a mono- or di-substituted derivative of each, the substituents being selected from the group consisting of hydroxy, lower alkoxy, loweralkyl, methylenedioxy, amino, loweralkylamino, diloweralkylamino, nitro and halo; $R_1$ is hydrogen, cyclohexyl, phenyl, loweralkyl-substituted cyclohexyl, or loweralkyl-substituted phenyl, and $R_2$ is hydrogen; $R_1$ and $R_2$ take together is =CH—Ar as herein defined; or $R_1$ and $R_2$ taken together with the portion of the cyclanone ring to which they are attached is

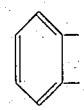

or a loweralkyl or loweralkoxy substituted derivative thereof.

Another aspect of this invention relates to an anti-androgenic composition comprising an antibiotic, an inert diluent, and an androgen-inhibiting proportion of an arylidene cyclanone having the formula

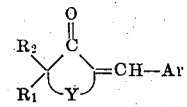

in which Y is —CHR—, —CHR—CHR—, or —CHR—CHR—CHR—; each R independently is hydrogen, methyl, ethyl or propyl; Ar is phenyl, furyl, thienyl, styryl, naphthyl, or a mono- or di-substituted derivative of each, the substituents being selected from the group consisting of hydroxy, lower alkoxy, loweralkyl, methylenedioxy, amino, loweralkylamino, diloweralkylamino, nitro and halo; $R_1$ is hydrogen, cyclohexyl, phenyl, loweralkyl-substituted cyclohexyl, or loweralkyl-substituted phenyl, and $R_2$ is hydrogen; $R_1$ and $R_2$ taken together is =CH—Ar as herein defined; or $R_1$ and $R_2$ taken together with the portion of the cyclanone ring to which they are attached is

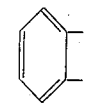

or a loweralkyl or loweralkoxy substituted derivative thereof.

Certain of the arylidene cyclanones comprise a further aspect of this invention and have the formula

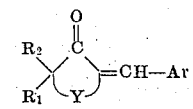

in which Y is —CHR—, —CHR—CHR—, or —CHR—CHR—CHR—; each R independently is hydrogen, methyl, ethyl or propyl; Ar is phenyl, furyl, thienyl, styryl, naphthyl, or a mono- or di-substituted derivative of each, the substituents being selected from the group consisting of hydroxy, loweralkoxy, loweralkyl, methylenedioxy, amino, loweralkylamino, di-loweralkylamino, nitro and halo; $R_1$ is cyclohexyl, phenyl, loweralkyl-substituted cyclohexyl, or loweralkyl-substituted phenyl, and $R_2$ is hydrogen; and $R_1$ and $R_2$ taken together with the portion of the cyclanone ring to which they are attached is

or a loweralkyl or loweralkoxy substituted derivative thereof.

DETAILED DESCRIPTION OF THE INVENTION

The compounds used in this invention are cyclanones containing at least one and optionally two arylidene substituents, which substituents are located at the carbons immediately adjacent to the carbonyl of the cyclanone ring.

The term "lower" as used herein when referring to alkoxy means a $C_1$–$C_4$ alkoxy, and is illustrated by, for example, methoxy, ethoxy, propoxy, isopropoxy, n-butoxy, isobutoxy, and t-butoxy. When referring to alkyl, the term "lower" refers to a $C_1$–$C_4$ alkyl such as methyl, ethyl, propyl, isopropyl, n-butyl, isobutyl, and t-butyl.

The term "halo" as used herein refers to fluoro, chloro, bromo, or iodo.

As herein defined, $R_1$ and $R_2$ taken together with the portion of the cyclanone ring to which they are attached can be

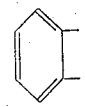

or loweralkyl or loweralkoxy substituted derivative thereof. In such instances as the aforementioned, it will be apparent that what is thereby defined is an o-phenylene or substituted o-phenylene group and that this group forms part of the cyclanone ring through the ortho carbons of the phenylene ring.

Illustrative of compounds which can be used in this invention are the following:

2,4-dibenzylidenecyclobutanone
2,5-dibenzylidenecyclopentanone
2,6-dibenzylidenecyclohexanone
2,7-dibenzylidenecycloheptanone
2,4-di-(2-chlorobenzylidene)cyclobutanone
2,5-di-(3-fluorobenzylidene)cyclopentanone
2,6-di-(4-bromobenzylidene)cyclohexanone
2,6-di-(3-iodobenzylidene)cyclohexanone
2,5-di-(4-methoxybenzylidene)cyclopentanone
2,5-di-(3-ethoxybenzylidene)-3-methylcyclopentanone
2,6-di-(4-isobutylbenzylidene)-4-methylcyclohexanone
2,5-di-(3,4-dimethoxybenzylidene)cyclopentanone
2,6-dibenzylidene-3-methylcyclohexanone
2,6-di-(4-hydroxybenzylidene)cyclohexanone
2,5-di-(2-bromo-4-hydroxybenzylidene)cyclopentanone
2,4-di-(3-hydroxybenzylidene)cyclobutanone
2,6-di-(4-hydroxybenzylidene)-4-ethylcyclohexanone
2,6-di-(3-methoxy-4-hydroxybenzylidene)cyclohexanone
2,4-di-(4-tolylidene)cyclobutanone
2,6-di-(3-isopropylbenzylidene)cyclohexanone
2,5-di-(3-nitrobenzylidene)cyclopentanone
2,6-di-(4-aminobenzylidene)cyclohexanone
2,5-di-(4-ethylaminobenzylidene)cyclopentanone
2,4-di-(3-dimethylaminobenzylidene)cyclobutanone
2,6-di-(2-furfurylidene)-3-methylcyclohexanone
2,5-di-(4-chloro-2-furfurylidene)cyclopentanone
2,6-di-(2-thenylidene)cyclohexanone
2,5-di-(4-methyl-2-thenylidene)cyclopentanone
2,6-di-cinnamylidenecyclohexanone
2,5-di-(α-naphthylmethylene)cyclopentanone
2,7-di-(β-naphthylmethylene)cycloheptanone
2-benzylidenecyclopentanone
2-benzylidene-3-methylcyclopentanone
2-benzylidene-indanone-1
2-(α-naphthylmethylene)indanone-1
2-cyclohexyl-5-benzylidenecyclopentanone
2-cyclohexyl-6-benzylidene-3-methylcyclohexanone
2-cyclohexyl-6-(3-thenylidene)cyclohexanone
2-cyclohexyl-4-(2-thenylidene)cyclobutanone
2-phenyl-6-(4-methoxybenzylidene)-4-methylcyclohexanone The above compounds are intended only to illustrate the variety of structures which can be used in the process of this invention, and the foregoing listing is not to be construed as limiting the scope of the invention.

Particularly preferred compounds which are administered in accordance with the method of this invention are diarylidene cyclanones. These are defined as having the formula

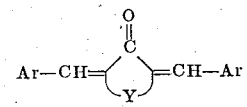

in which Y is —$CH_2$—, —$CH_2$—$CH_2$—, or —$CH_2$—$CHR$—$CH_2$—; R is hydrogen or methyl; and Ar is phenyl, furyl, thienyl, styryl, naphthyl, or a mono- or di-substituted derivative of each, the substituents being selected from the group consisting of hydroxy, loweralkoxy, loweralkyl, methylenedioxy, amino, loweralkylamino, di-loweralkylamino, nitro, and halo.

The arylidene cyclanones used in this invention can be conveniently prepared by condensing the appropriate cyclic ketone with a suitable aryl aldehyde under alkaline conditions. The synthesis can be carried out using any of a variety of sets of reaction conditions. For example, the cyclic ketone and aryl aldehyde can be dissolved together in a suitable solvent and base added to the solution. In another reaction scheme, the cyclic ketone and base can be placed in a suitable solvent and the aryl aldehyde added to the mixture. Depending upon the particular reactants which are used, the arylidene cyclanone may be produced rapidly and at room temperature or lower, or heating of the reaction mixture may be necessary in order to effect condensation of the reactants. The determination of reaction conditions is well within the skill of those skilled in the art.

If a diarylidene cyclanone is desired, at least a 2:1 molar ratio of aryl aldehyde to cyclic ketone must be used, and the cyclic ketone must be free of substitution at the carbon atoms adjacent to the carbonyl function. In the event that a monoarylidene cyclanone is desired, a 1:1 molar ratio of aryl aldehyde to cyclic ketone or a slight excess of aryl aldehyde is employed. The cyclic ketone which is employed will be appropriately substituted with substituents intended to be present in the final product, and this will include appropriate substitution at one of the carbon atoms adjacent to the carbonyl function of the ketone. If the final product is intended to be a monoarylidene cyclanone which remains unsubstituted at one of the carbon atoms adjacent to the carbonyl function, in order to avoid preparation of a mixture of the monoarylidene cyclanone and the diarylidene cyclanone, it will be necessary to modify the cyclic ketone so that arylidene substitution will occur at only one of the carbons adjacent to the carbonyl function. This can be accomplished, for example, by first reacting the selected cyclic ketone with morpholine to produce an N(1-cycloalkenyl)morpholine; secondly, condensing the substituted morpholine with the selected aryl aldehyde; and, thirdly, cleaving the product under acidic conditions to obtain the desired monoarylidene cyclanone unsubstituted at one of the carbon atoms adjacent to the carbonyl function.

The alkaline reagent which is employed in the condensation reaction need only be one which will assure a basic reaction medium. Generally, and for the sake of convenience and economy, an alkali metal hydroxide, such as, for example, sodium hydroxide or potassium hydroxide, will be employed.

As previously indicated, this invention is directed to a method for inhibiting androgen action and to compounds and compositions useful therein. The action of an androgen is evidenced by development of secondary male sex characteristics. Although important to normal development, as previously mentioned, androgens can and do stimulate the development of undesirable properties, such as acne and prostatic hypertrophy. An agent which can inhibit but not extinguish androgen action is highly attractive. Such an agent administered in appropriate dose either prophylactically or therapeutically is the basis of the teaching of this invention. Generally, a suitable dose level will be from about 0.1 milligram to about 50 milligrams of the arylidene cyclanone per kilogram body weight of the recipient per day. Preferably, the dosage level will be from about 0.1 milligram to about 30 milligrams per kilogram body weight per day, and, more preferably, from about 1 milligram to about 5 milligrams per kilogram body weight per day.

The arylidene cyclanones of this invention are highly attractive not only due to their activity in inhibiting the action of androgens but also because of their exceptionally low levels of toxicity. The arylidene cyclanones are administrable in large dosages without development of serious detrimental side effects.

The arylidene cyclanones used in accordance with the method of this invention can be administered in any suitable form and manner. Administration can be by any of the usual routes, including, for example, oral, topical, subcutaneous, intraperitoneal, and intramuscular.

The arylidene cyclanones can be administered alone or in combination with an appropriate inert diluent such as corn oil or an ethanol-saline mixture.

Likewise, the anti-androgens defined by this invention can be prepared for oral administration using any of the customary forms, including, for example, lozenges, chewing gum, capsules, tablets, and medicinal candy.

Preparations suitable for topical administration may likewise be prepared. These include preparations in liquid form for spraying, etc. Lotions, creams, ointments, salves, etc., are also suitable preparative forms.

The anti-androgens also may be present in combination with non-interfering therapeutic agents, for example, appropriate antibiotics.

The following examples illustrate this invention with respect both to the preparation and activity of the anti-androgen agents.

EXAMPLE 1: PREPARATION OF 2,7-DIBENZYLIDENECYCLOHEPTANONE

About 22.4 grams (0.2 mole) of cycloheptanone and 42.4 grams (0.4 mole) of benzaldehyde were dissolved in a mixture of 300 milliliters of methanol and 100 milliliters of water. To this solution 120 milliliters of 10 percent aqueous potassium hydroxide were added dropwise during which time the solution turned light yellow. The mixture was stirred 3 hours, the last hour of which it was heated to reflux, and then permitted to stand overnight. A precipitate formed, and the mixture was filtered, the precipitate recrystallized from dilute acetic acid to afford 7.3 grams of yellow needles of 2,7-dibenzylidenecycloheptanone, m.p. 105°–107°C.

EXAMPLE 2: PREPARATION OF 2,6-DIBENZYLIDENE-4-METHYLCYCLOHEXANONE

About 22.4 grams (0.2 mole) of 4-methylcyclohexanone and 53.0 grams (0.5 mole) of benzaldehyde were dissolved in 350 milliliters of methanol. To this stirred solution 100 milliliters of 10 percent aqueous potassium hydroxide were added dropwise. A yellow precipitate formed after about 45 minutes and stirring was continued for an additional 6 hours. The mixture was filtered, and the yellow cake was recrystallized from methanol:water to afford 45 grams of canary yellow needles of 2,6-dibenzylidene-4-methylcyclohexanone, m.p. 96.5°–98.5°C.

EXAMPLE 3: PREPARATION OF 2,5-DI-(4-TOLYLIDENE)CYCLOPENTANONE

About 21.0 grams (0.25 mole) of cyclopentanone and 61.5 grams (0.51 mole) of p-tolylaldehyde were dissolved in a mixture of 300 milliliters of methanol and 100 milliliters of water. The resulting solution was cooled to about 5°C. with stirring, and 90 milliliters of 10 percent aqueous potassium hydroxide were added over a 5 minute period. Within 10 minutes a heavy yellow precipitate formed. The reaction mixture was stirred an additional 6 hours during which time it was allowed to warm to room temperature. The mixture was filtered, and the solid recrystallized from glacial acetic acid containing dimethylformamide. About 63 grams of 2,5-di-(4-tolylidene)cyclopentanone, as bright canary yellow needles, having a m.p. of 236°–238.5°C., were collected.

EXAMPLE 4: PREPARATION OF 2,5-DI-(4-METHOXYBENZYLIDENE)CYCLOPENTANONE

About 21.0 grams (0.25 mole) of cyclopentanone and 70.7 grams (0.52 mole) p-anisaldehyde were dissolved in 300 milliliters of methanol. The resulting solution was cooled to 5°C. with stirring, and 100 milliliters of 10 percent aqueous potassium hydroxide were added over a 3-minute period. Almost immediately a precipitate formed, and stirring of the reaction mixture was continued without cooling while the mixture warmed to room temperature. The mixture was filtered, and the solid recrystallized from a mixture of glacial acetic acid and dimethylformamide. About 75.5 grams of 2,5-di-(4-methoxybenzylidene)cyclopentanone, as canary yellow flakes, having a m.p. of 208°–210.5°C., were collected.

EXAMPLE 5: PREPARATION OF 2,5-DI-(3,4-DIMETHOXYBENZYLIDENE)CYCLOPENTANONE

About 21.0 grams (0.25 mole) of cyclopentanone and 86.3 grams (0.52 mole) of 3,4-dimethoxybenzaldehyde were dissolved in 300 milliliters of methanol. The resulting solution was cooled to about 5°C. with stirring, and 90 milliliters of 10 percent aqueous potassium hydroxide were added. A heavy yellow precipitate formed after about 10 minutes. The reaction mixture was filtered, and the solid recrystallized from a mixture of glacial acetic acid and dimethylformamide. About 88.7 grams of 2,5-di-(3,4-dimethoxybenzylidene)-cyclopentanone, as a canary yellow powder, having a m.p. of 191°–193°C., were collected.

EXAMPLE 6: PREPARATION OF 2,5-DI-(4-DIMETHYLAMINOBENZYLIDENE)CYCLOPENTANONE

About 16.8 grams (0.2 mole) of cyclopentanone and 67.0 grams (0.45 mole) of p-dimethylaminobenzaldehyde were dissolved in 450 milliliters of methanol. The resulting solution was stirred, and 100 milliliters of 10 percent aqueous potassium hydroxide was added at room temperature over a 15-minute period. An orange precipitate formed, and stirring was continued for 5 hours, after which time the reaction mixture was allowed to stand overnight. The mixture was filtered, and the solid was recrystallized from dimethylformamide. About 58.5 grams of 2,5-di-(4-dimethylaminobenzylidene)cyclopentanone, as a deep orange crystalline material, having a m.p. of 269°–273°C. (dec.), were collected.

EXAMPLE 7: PREPARATION OF 2,5-DI-(4-NITROBENZYLIDENE)CYCLOPENTANONE

About 6.7 grams (0.082 mole) of cyclopentanone was dissolved in a mixture of 75 milliliters of methanol and 15 milliliters of 2N sodium hydroxide, and the resulting solution cooled in an ice bath. To this solution 25 grams (0.165 mole) of p-nitrobenzaldehyde dissolved in 125 milliliters of a mixture of tetrahydrofuran and methanol were added dropwise with continuous stirring of the mixture. The mixture turned dark red, and stirring was continued for about 8 hours after completion of the dropwise addition. The mixture was allowed to stand overnight, and a solid which precipitated was filtered off. The solid was recrystallized from a mixture of glacial acetic acid and dimethylformamide to give about 21 grams of 2,5-di-(4-nitrobenzylidene)-cyclopentanone as golden crystals, having a m.p. of 249°–254°C. (dec.).

EXAMPLE 8: PREPARATION OF 2,5-DI-(2-THENYLIDENE))CYCLOPENTANONE

About 8.4 grams (0.1 mole) of cyclopentanone and 22.4 grams (0.2 mole) of thiophene- 2-aldehyde were dissolved in 100 milliliters of methanol. About 50 milliliters of 10 percent aqueous potassium hydroxide were added to the mixture during which time a precipitate formed. The mixture was stirred for an additional 4 hours, after which time the solid was collected by filtration and recrystallized from acetic acid. About 9.0 grams of 2,5-di-(2-thenylidene)cyclopentanone, as golden brown needles, having a m.p. of 225°–228°C., were collected.

EXAMPLE 9: PREPARATION OF 2,6-DI-(2-THENYLIDENE)CYCLOHEXANONE

About 29.4 grams (0.3 mole) of cyclohexanone and 67.2 grams (0.6 mole) of thiophene-2-aldehyde were dissolved in 200 milliliters of methanol. About 100 milliliters of 5 percent aqueous potassium hydroxide were added dropwise to the stirred solution. A yellow precipitate formed upon completion of addition of the potassium hydroxide. Stirring was continued for about 6 hours, after which time the solid was removed by filtration and recrystallized from a mixture of ethanol and glacial acetic acid. About 61.4 grams of 2,6-di-(2-thenylidene)cyclohexanone, as brownish-yellow needles, having a m.p. of 152°–155°C., were collected.

EXAMPLE 10: PREPARATION OF 2,5-DI-(4-CHLOROBENZYLIDENE)CYCLOPENTANONE

About 21 grams (0.25 mole) of cyclopentanone and 74.4 grams (0.53 mole) of p-chlorobenzaldehyde were dissolved in 300 milliliters of methanol. About 90 milliliters of 10 percent aqueous potassium hydroxide were added over a 5-minute period. A heavy yellow precipitate formed, and the reaction mixture was permitted to stand overnight, after which time the solid was removed by filtration. The solid upon recrystallization from a mixture of glacial acetic acid and dimethylformamide afforded about 81.5 grams of 2,5-di-(4-chlorobenzylidene)cyclopentanone, as yellow flakes having a m.p. of 218°–220°C.

EXAMPLE 11: PREPARATION OF 2,6-DIBENZYLIDENE-3-METHYLCYCLOHEXANONE

About 22.4 grams (0.2 mole) of 3-methylcyclohexanone and 53 grams (0.5 mole) of benzaldehyde were dissolved in 350 milliliters of methanol. About 110 milliliters of 10 percent aqueous potassium hydroxide were added dropwise to the stirred solution. The mixture was allowed to stand overnight during which time a precipitate formed. The precipitate was removed by filtration and recrystallized from a mixture of ethanol and water to produce about 43.0 grams of 2,6-dibenzylidene-3-methylcyclohexanone, having a m.p. of 110°–113°C.

EXAMPLE 12: PREPARATION OF 2-BENZYLIDENECYCLOPENTANONE

About 84 grams (1 mole) of cyclopentanone and 104.4 grams (1.2 mole) of morpholine were dissolved in 175 milliliters of dry benzene. The mixture was refluxed for 8 hours, and a water trap was used to remove any water which formed during the reaction. Benzene and morpholine were removed from the reaction mixture in vacuo on a steam bath and the residue was distilled to produce 110 grams of N(1-cyclopentenyl)morpholine, b.p., 116°–118°C./22 mm.

To 100 milliliters of benzene was added 31.8 grams (0.3 mole) benzaldehyde and 61.2 grams (0.4 mole) of N(1-cyclopentenyl)morpholine. The resulting yellow solution was refluxed for 12 hours using a water trap to collect water formed during the reaction. Approximately 5 milliliters of water were collected in the trap during the reflux period. The reaction mixture was then cooled to room temperature, and a solution of 60 milliliters of concentrated hydrochloric acid and 60 milliliters of water was added with stirring. Benzene (50 milliliters) was added to the mixture, and stirring was continued for 1 hour. The aqueous layer was then separated from the benzene and extracted with additional benzene which was combined with the benzene reaction mixture. Benzene was removed in vacuo to give a heavy, dark brown residue which crystallized on standing. The residue was then distilled to produce 33.5 grams of 2-benzylidenecyclopentanone having a boiling point of 136°–140°C./0.65-0.7 mm. This substance crystallized on cooling to a light yellow solid having m.p. 67°–70°C.

EXAMPLE 13: PREPARATION OF 2-BENZYLIDENECYCLOHEXANONE

About 50.1 grams (0.3 mole) of N-(1-cyclohexenyl)-morpholine (prepared in the manner described in Example 12) and about 42.4 grams (0.4 mole) of benzaldehyde were dissolved in 150 milliliters of dry benzene. The resulting solution was refluxed 24 hours using a water trap to collect water formed during the reaction. The reaction mixture was then cooled to room temperature, and a mixture of about 70 milliliters concentrated hydrochloric acid and 70 milliliters water was added with stirring continued for about 1 hour. The aqueous layer was separated from the benzene layer and extracted with more benzene which was combined with the benzene reaction mixture. The benzene was removed and residue was distilled to produce a straw colored oil which crystallized on standing. Recrystallization from hexene provided about 15 grams of 2-benzylidenecyclohexanone, having a m.p. of 110°–114°C.

EXAMPLE 14: PREPARATION OF 2-(4-CHLOROBENZYLIDENE)CYCLOPENTANONE

About 15.3 grams (0.1 mole) of N-(1-cyclopentenyl)-morpholine (prepared as described in Example 12) and about 15.0 grams (0.1 mole) of p-chlorobenzaldehyde were dissolved in 150 milliliters of dry benzene. The resulting solution was refluxed for 18 hours using a water trap to collect water produced during the reaction. The reaction mixture was cooled to room temperature, and a mixture of about 25 milliliters concentrated hydrochloric acid and 25 milliliters water was added along with 50 milliliters of benzene. The benzene layer was separated from the aqueous layer, and the benzene evaporated to a dark residue which solidified on standing. Recrystallization from hexane gave about 7.5 grams of 2-(4-chlorobenzylidene)cyclopentanone, as golden brown crystals, having a m.p. of 68°–73°C.

EXAMPLE 15: PREPARATION OF 2-CYCLOHEXYL-6-BENZYLIDENECYCLOHEXANONE

About 18.0 grams (0.1 mole) of 2-cyclohexylcyclohexanone and 13.7 grams (0.13 mole) of benzaldehyde were dissolved in 75 milliliters of methanol. To this stirred mixture, 50 milliliters of 10 percent aqueous potassium hydroxide were added dropwise. The solution turned pale yellow and turbid during addition of the potassium hydroxide, and the resulting mixture was refluxed with stirring for 5 hours. It was then allowed to stand for 3 days during which time a precipitate formed which was filtered from the mixture. The collected solid was recrystallized from methanol containing a minor amount of ethanol and water to give 19.2 grams of 2-cyclohexyl-6-benzylidenecyclohexanone, as white crystals having m.p. of 95°–97°C.

EXAMPLE 16: PREPARATION OF 2-BENZYLIDENE-1-INDANONE

About 13.2 grams (0.1 mole) of indanone and 12.7 grams (0.12 mole) of benzaldehyde were dissolved in 300 milliliters of methanol. To this stirred mixture was added dropwise 90 milliliters of 10 percent aqueous potassium hydroxide over a 20-minute period. Upon addition of approximately one-half of the potassium hydroxide a white precipitate formed. Upon completion of the addition of the potassium hydroxide the reaction mixture was stirred at room temperature for 3.5 hours after which time the white solid was collected by filtration. The white solid was crystallized from an ethanol:water mixture to give 19.5 grams of 2-benzylidene-1-indanone, as a white crystalline material having a m.p. 108.5°–110.5°C.

EXAMPLE 17: PREPARATION OF 2-BENZYLIDENE-6-METHOXYTETRALONE-1

About 10.5 grams (0.06 mole) of 6-methoxytetralone-1 in 100 milliliters of 10 percent aqueous potassium hydroxide was stirred at room temperature during which time 15.9 grams (0.15 mole) of benzaldehyde in 300 milliliters of methanol were added dropwise. The stirring was continued for 4 hours during which time no precipitate formed. The reaction mixture was refrigerated overnight during which time a precipitate formed. The precipitate was collected and recrystallized from a mixture of ethanol and water to produce about 3.2 grams of 2-benzylidene-6-methoxytetralone-1 having a melting point of 96°–98°C.

Other representative compounds include the following:

2,4-dibenzylidenecyclobutanone, m.p., 175°–178°C.
2,5-dibenzylidenecyclopentanone, m.p., 186°–189°C.
2,6-dibenzylidenecyclohexanone, m.p., 115°–117°C.
2,5-di(3-methoxy-4-hydroxybenzylidene)cyclopentanone, m.p., 184°–187°C.
2,6-di(3-methoxy-4-hydroxybenzylidene)cyclohexanone, m.p., 178°–180°C.
2,5-di(3-chlorobenzylidene)cyclopentanone, m.p., 162°–166°C.
2,5-di(4-fluorobenzylidene)cyclopentanone, m.p., 237°–241°C.
2,5-di(3,4-methylenedioxybenzylidene)cyclopentanone, m.p., 244°–246°C.

2,5-dicinnamylidenecyclopentanone, m.p., 225.5°–227°C.
2,5-di(β-methylcinnamylidene)cyclopentanone, m.p., 185°–187°C.
2,5-di(α-naphthylmethylene)cyclopentanone, m.p., 184.5°–185.5°C.
2,5-di(2-furfurylidene)cyclopentanone, m.p., 163°–166°C.
2,4-di(2-thenylidene)cyclobutanone, m.p., 182°–184°C.
2-benzylidene-6-(4-isopropylphenyl)cyclohexanone, m.p., 70°C.
2-(2-thenylidene)-6-cyclohexylcyclohexanone, m.p., 68°–69°C.

The anti-androgen activity of the arylidene cyclanones defined by this invention can be demonstrated by a customary antiandrogen assay conducted in accordance with the following scheme using immature male rats. These rats, when twenty-one days old, were castrated and separated into at least two groups, a testosterone stimulated group comprising 12 rats and one or more experimental groups, each comprising six rats. Beginning the day of castration, the testosterone stimulated group received 0.2 milligram of testosterone per day for 12 consecutive days. The experimental group (one group for each compound and dose level tested) received an injection of 0.2 milligram of testosterone as well as subcutaneous injection of the prescribed amount of the experimental compound each day for 12 consecutive days. On the 13th day, all of the rats, each being 33 days old, were sacrificed and autopsied, the following endocrine glands being removed and weighed:

a. seminal vesicles
  ventral prostate
c. levator ani
d. preputial glands

The organ weights of each experimental group were compared with those of the testosterone stimulated group and the differences calculated and expressed as percent inhibition.

The effect of the administered arylidene cyclanone on the testosterone is evidenced by the failure of the weighed endocrine glands to grow at the rate indicated for the testosterone-stimulated rats which did not receive any of the arylidene cyclanone.

Table I following demonstrates the androgen-inhibiting activity of arylidene cyclanones.

Table I

Anti-Androgen Activity – Arylidene Cyclanones

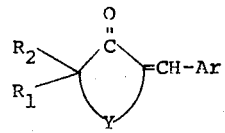

| Compound | | | | Percent Decrease[c] | | | |
|---|---|---|---|---|---|---|---|
| $R_1, R_2$[a] | Ar | Y | Dose mg./day | SV | VP | LA | PP |
| S | Phenyl | $-CH_2-$ | 1.0 | 57 | 48 | 34 | 17 |
| S | Phenyl | $-CH_2-$ | 2.0[b] | 50 | 30 | 29 | 21 |
| S | Phenyl | $-CH_2-$ | 3.0 | 51 | 36 | 30 | 28 |
| S | Phenyl | $-CH_2-CH_2-$ | 2.0 | 0 | 0 | 27 | 34 |
| S | Phenyl | $-CH_2-CH_2-CH_2-$ | 1.0 | 42 | 26 | 28 | 15 |
| S | Phenyl | $-CH_2-CH_2-CH_2-$ | 2.0[b] | 33 | 15 | 11 | 36 |
| S | Phenyl | $-CH_2-CH_2-CH_2-CH_2-$ | 2.0 | 14 | 13 | 19 | 35 |
| S | Phenyl | $-CH_2-CH(CH_3)-CH_2-$ | 0.01 | 24 | 7 | 27 | 28 |
| S | Phenyl | $-CH_2-CH(CH_3)-CH_2-$ | 0.03 | 34 | 27 | 35 | 59 |
| S | Phenyl | $-CH_2-CH(CH_3)-CH_2-$ | 0.1 | 46 | 42 | 34 | 37 |
| S | Phenyl | $-CH_2-CH(CH_3)-CH_2-$ | 2.0 | 48 | 47 | 19 | 33 |
| S | 4-Tolyl | $-CH_2-CH_2-$ | 2.0 | 9 | 11 | 19 | 4 |
| S | 4-Tolyl | $-CH_2-CH_2-$ | 3.0 | 64 | 39 | 37 | 39 |
| S | 4-Anisyl | $-CH_2-CH_2-$ | 2.0 | 16 | 7 | 27 | 22 |
| S | 3,4-Dimethoxyphenyl | $-CH_2-CH_2-$ | 0.01 | 29 | 31 | 22 | 20 |
| S | 3,4-Dimethoxyphenyl | $-CH_2-CH_2-$ | 0.03 | 23 | 22 | 25 | 26 |
| S | 3,4-Dimethoxyphenyl | $-CH_2-CH_2-$ | 0.1 | 43 | 38 | 16 | 17 |
| S | 3,4-Dimethoxyphenyl | $-CH_2-CH_2-$ | 0.3 | 49 | 46 | 31 | 32 |
| S | 3,4-Dimethoxyphenyl | $-CH_2-CH_2-$ | 1.0 | 42 | 50 | 32 | 29 |
| S | 3,4-Dimethoxyphenyl | $-CH_2-CH_2-$ | 3.0 | 58 | 64 | 38 | 32 |
| S | 3,4-Dimethoxyphenyl | $-CH_2-CH_2-CH_2-$ | 0.01 | 9 | 14 | 26 | 24 |

Table I (cont'd)

Anti-Androgen Activity - Arylidene Cyclanones

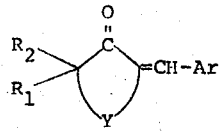

| Compound | | | Dose | Percent Decrease[c] | | | |
|---|---|---|---|---|---|---|---|
| $R_1, R_2$[a] | Ar | Y | mg./day | SV | VP | LA | PP |
| S | 3,4-Dimethoxyphenyl | $-CH_2-CH_2-CH_2-$ | 0.03 | 5 | 13 | 22 | 22 |
| S | 3,4-Dimethoxyphenyl | $-CH_2-CH_2-CH_2-$ | 0.1 | 7 | 16 | 17 | 31 |
| S | 3,4-Dimethoxyphenyl | $-CH_2-CH_2-CH_2-$ | 1.0 | 36 | 43 | 19 | 18 |
| S | 3-Methoxy-4-hydroxyphenyl | $-CH_2-CH_2-$ | 0.03 | 21 | 26 | 27 | 0 |
| S | 3-Methoxy-4-hydroxyphenyl | $-CH_2-CH_2-$ | 0.1 | 43 | 39 | 29 | 28 |
| S | 3-Methoxy-4-hydroxyphenyl | $-CH_2-CH_2-$ | 0.3 | 40 | 36 | 28 | 26 |
| S | 3-Methoxy-4-hydroxyphenyl | $-CH_2-CH_2-$ | 2.0 | 21 | 34 | 6 | 0 |
| S | 3-Methoxy-4-hydroxyphenyl | $-CH_2-CH_2-CH_2-$ | 0.03 | 38 | 40 | 52 | 23 |
| S | 3-Methoxy-4-hydroxyphenyl | $-CH_2-CH_2-CH_2-$ | 0.1 | 20 | 32 | 26 | 13 |
| S | 3-Methoxy-4-hydroxyphenyl | $-CH_2-CH_2-CH_2-$ | 0.3 | 35 | 36 | 20 | 39 |
| S | 3-Methoxy-4-hydroxyphenyl | $-CH_2-CH_2-CH_2-$ | 1.0 | 40 | 31 | 19 | 33 |
| S | 3-Methoxy-4-hydroxyphenyl | $-CH_2-CH_2-CH_2-$ | 3.0 | 43 | 41 | 3 | 40 |
| S | 3-Chlorophenyl | $-CH_2-CH_2-$ | 1.0 | 41 | 57 | 31 | 27 |
| S | 4-Fluorophenyl | $-CH_2-CH_2-$ | 1.0 | 40 | 51 | 35 | 21 |
| S | 3,4-Methylenedioxyphenyl | $-CH_2-CH_2-$ | 1.0 | 12 | 7 | 10 | 20 |
| S | 3,4-Methylenedioxyphenyl | $-CH_2-CH_2-$ | 2.0[b] | 61 | 45 | 50 | 37 |
| S | 3,4-Methylenedioxyphenyl | $-CH_2-CH_2-$ | 3.0 | 57 | 41 | 49 | 47 |
| S | 4-Dimethylaminophenyl | $-CH_2-CH_2-$ | 3.0 | 15 | 7 | 26 | 24 |
| S | 4-Nitrophenyl | $-CH_2-CH_2-$ | 0.5 | 0 | 21 | 9 | 17 |
| S | α-Styryl | $-CH_2-CH_2-$ | 1.0 | 61 | 36 | 42 | 14 |
| S | α-Styryl | $-CH_2-CH_2-$ | 2.0[b] | 55 | 50 | 32 | 21 |
| S | α-Styryl | $-CH_2-CH_2-$ | 3.0 | 54 | 26 | 3 | 18 |
| S | α-Methyl-α-styryl | $-CH_2-CH_2-$ | 3.0 | 43 | 34 | 22 | 23 |
| S | α-Naphthyl | $-CH_2-CH_2-$ | 1.0 | 40 | 40 | 26 | 0 |
| S | α-Naphthyl | $-CH_2-CH_2-$ | 2.0[b] | 33 | 0 | 3 | 10 |
| S | α-Naphthyl | $-CH_2-CH_2-$ | 3.0 | 28 | 16 | 26 | 0 |
| S | 2-Furyl | $-CH_2-CH_2-$ | 0.3 | 12 | 11 | 4 | 0 |
| S | 2-Furyl | $-CH_2-CH_2-$ | 1.0 | 30 | 41 | 16 | 24 |
| S | 2-Furyl | $-CH_2-CH_2-$ | 3.0 | 48 | 48 | 29 | 16 |
| S | 2-Thienyl | $-CH_2-$ | 1.0 | 27 | 37 | 15 | 16 |
| S | 2-Thienyl | $-CH_2-$ | 3.0 | 44 | 38 | 35 | 24 |
| S | 2-Thienyl | $-CH_2-CH_2-$ | 1.0 | 46 | 23 | 47 | 46 |
| S | 2-Thienyl | $-CH_2-CH_2-$ | 3.0[b] | 68 | 43 | 27 | 40 |
| S | 2-Thienyl | $-CH_2-CH_2-CH_2-$ | 1.0 | 55 | 38 | 40 | 29 |
| S | 2-Thienyl | $-CH_2-CH_2-CH_2-$ | 2.0[b] | 50 | 35 | 38 | 18 |
| S | 2-Thienyl | $-CH_2-CH_2-CH_2-$ | 3.0 | 46 | 39 | 35 | 2 |
| S | 3-Thienyl | $-CH_2-CH_2-$ | 1.0 | 51 | 38 | 41 | 36 |
| S | 3-Thienyl | $-CH_2-CH_2-$ | 2.0[b] | 47 | 35 | 23 | 29 |

Table I (cont'd)

Anti-Androgen Activity - Arylidene Cyclanones

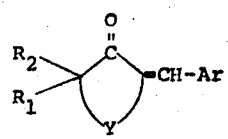

| Compound | | | Dose | Percent Decrease[c] | | | |
|---|---|---|---|---|---|---|---|
| $R_1, R_2$[a] | Ar | Y | mg./day | SV | VP | LA | PP |
| S | 3-Thienyl | $-CH_2-CH_2-$ | 3.0 | 22 | 9 | 28 | 24 |
| H,H | Phenyl | $-CH_2-CH_2-$ | 1.0 | 52 | 40 | 38 | 28 |
| H,H | Phenyl | $-CH_2-CH_2-$ | 2.0[b] | 43 | 28 | 19 | 22 |
| Cyclohexyl, H | Phenyl | $-CH_2-CH_2-CH_2-$ | 2.0[b] | 42 | 0 | 12 | 14 |
| 4-Cumyl, H | Phenyl | $-CH_2-CH_2-CH_2-$ | 1.0 | 41 | 28 | 23 | 43 |
| 4-Cumyl, H | Phenyl | $-CH_2-CH_2-CH_2-$ | 2.0[b] | 48 | 8 | 11 | 16 |
| Cyclohexyl, H | 2-Thienyl | $-CH_2-CH_2-CH_2-$ | 1.0 | 10 | 14 | 35 | 31 |
| Cyclohexyl, H | 3-Thienyl | $-CH_2-CH_2-CH_2-$ | 1.0 | 52 | 45 | 37 | 50 |
| Cyclohexyl, H | 3-Thienyl | $-CH_2-CH_2-CH_2-$ | 2.0 | 59 | 53 | 35 | 39 |
| | Phenyl | $-CH_2-$ | 1.0 | 52 | 42 | 40 | 21 |
| | Phenyl | $-CH_2-$ | 2.0[b] | 55 | 8 | 30 | 40 |
| | Phenyl | $-CH_2-$ | 3.0 | 48 | 37 | 20 | 48 | a. S refers to $R_1$ and $R_2$ taken together being the radical Ar-CH=.

b. Testosterone dosage was 0.1 mg./day instead of the prescribed 0.2 mg./day.

c. SV = Seminal Vesicle
   VP = Ventral Prostate
   LA = Levator Ani
   PP = Preputial glands The anti-androgen action of the arylidene cyclanones of this invention can also be demonstrated by the inhibiting effect they have on the uptake of testosterone by an androgen-dependent organ. As with the previously described test procedure, immature male rats, each 21 days old, were used. These rats were kept intact and were separated into four groups, arbitrarily designated as Groups, A, B, C, and D. The arylidene cyclanone used in this test was 4-methyl-2,6-dibenzylidenecyclohexanone. Group A was administered a single dose of 3.0 milligrams of the arylidene cyclanone and 30 minutes later received tritiated testosterone (TH³). Group B was administered 3.0 milligrams of the arylidene cyclanone daily for 3 consecutive days and 24 hours later received the TH³. Group C was administered 3.0 milligrams of the arylidene cyclanone daily for 12 consecutive days and 24 hours after the last administration received the TH³. Group D received nothing but the single administration of the TH³. All rats were autopsied 30 minutes subsequent to the administration of the TH³, and the ventral prostate of each was removed. As Table II following demonstrates the presence of radioactive testosterone was markedly reduced in the ventral prostate glands of those rats which were first administered the arylidene cyclanone when compared with those rats which received only the radioactive testosterone.

Table II

INHIBITION OF UPTAKE OR TESTOSTERONE

| Test Group | Dose/Day | Days | Percent Inhibition of Uptake of TH |
|---|---|---|---|
| A | 3.0 | 1 | 23 |
| B | 3.0 | 3 | 42 |
| C | 3.0 | 12 | 61 |

The above results give clear indication of the ability of the compounds of this invention to inhibit the uptake of testosterone by androgen-dependent glands and thereby to inhibit the action of androgens by precluding their retention in such glands.

I claim:

1. A process for inhibiting the action of androgens which comprises administering to a subject exhibiting a super-abundance of androgen action an effective quantity of an arylidene cyclanone having the formula

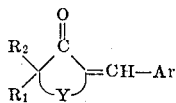

in which Y is —CHR—, —CHR—CHR—, or —CHR—CHR—CHR—; each R independently is hydrogen, methyl, ethyl or propyl; Ar is phenyl, furyl, thienyl, styryl, naphthyl, or a mono- or di-substituted derivative of each, the substituents being selected from the group consisting of hydroxy, loweralkoxy, loweralkyl, methylenedioxy, amino, loweralkylamino, di-loweralkylamino, nitro and halo; $R_1$ is hydrogen, cyclohexyl, phenyl, loweralkyl-substituted cyclohexyl, or loweralkyl-substituted phenyl, and $R_2$ is hydrogen; $R_1$ and $R_2$ taken together is =CH—Ar as herein defined; or $R_1$ and $R_2$ taken together with the portion of the cyclanone ring to which they are attached is

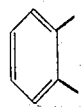

or a loweralkyl or loweralkoxy substituted derivative thereof.

2. The process of claim 1, which comprises administering from about 0.1 to about 50 milligrams of the arylidene cyclanone per kilogram body weight of the subject per day.

3. The process of claim 2, which comprises administering from about 0.1 to about 30 milligrams of the arylidene cyclanone per kilogram body weight of the subject per day.

4. The process of claim 3, which comprises administering an arylidene cyclanone having the formula

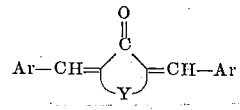

in which Y is —$CH_2$—, —$CH_2$—$CH_2$—, or —$CH_2$—CHR—$CH_2$—; R is hydrogen or methyl; and Ar is phenyl, furyl, thienyl, styryl, naphthyl, or a mono- or di-substituted derivative of each, the substituents being selected from the group consisting of hydroxy, loweralkoxy, loweralkyl, methylenedioxy, amino, loweralkylamino, di-loweralkylamino, nitro, and halo.

5. The process of claim 4, which comprises administering 2,5-di(3,4-dimethoxybenzylidene)cyclopentanone.

6. The process of claim 4, which comprises administering 2,6-dibenzylidene-4-methylcyclohexanone.

7. The process of claim 4, which comprises administering 2,6-di(3-methoxy-4-hydroxybenzylidene)cyclohexanone.

* * * * *